(12) United States Patent
Eichinger et al.

(10) Patent No.: US 11,619,343 B2
(45) Date of Patent: Apr. 4, 2023

(54) MULTI-FUNCTION CONTROLLER MOUNT

(71) Applicant: Otter Products, LLC, Fort Collins, CO (US)

(72) Inventors: Todd Eichinger, Fort Collins, CO (US); W. Travis Smith, Fort Collins, CO (US); Grady E. Barfoot, Denver, CO (US); Jonathan H. Guerdrum, Fort Collins, CO (US); Adam J. Havens, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 234 days.

(21) Appl. No.: 17/177,344

(22) Filed: Feb. 17, 2021

(65) Prior Publication Data

US 2021/0396350 A1    Dec. 23, 2021

Related U.S. Application Data

(60) Provisional application No. 63/042,624, filed on Jun. 23, 2020.

(51) Int. Cl.

| *F16M 11/38* | (2006.01) |
| *A63F 13/92* | (2014.01) |
| *F16M 13/00* | (2006.01) |
| *A63F 13/98* | (2014.01) |
| *F16M 11/10* | (2006.01) |

(52) U.S. Cl.
CPC ............. *F16M 11/38* (2013.01); *A63F 13/92* (2014.09); *A63F 13/98* (2014.09); *F16M 11/10* (2013.01); *F16M 13/00* (2013.01)

(58) Field of Classification Search
CPC .......... A63F 13/98; A63F 13/92; A63F 13/24; F16M 11/041; F16M 11/38; F16M 11/10; F16M 13/00; F16M 13/022
See application file for complete search history.

(56) References Cited

U.S. PATENT DOCUMENTS

| 6,530,838 | B2 | 3/2003 | Ha et al. |
| 6,585,212 | B2 | 7/2003 | Carnevali |
| 7,833,097 | B1 | 11/2010 | Maddox et al. |
| 8,074,956 | B2 * | 12/2011 | Wang ..................... F16M 13/00 248/397 |
| 9,005,026 | B2 | 4/2015 | Joynes et al. |
| 9,724,601 | B2 | 8/2017 | Fujita et al. |
| 9,802,118 | B2 * | 10/2017 | Hirshberg ............... A63F 13/24 |
| 10,194,541 | B2 * | 1/2019 | Deng ................... H05K 5/0017 |

(Continued)

*Primary Examiner* — Bradley Duckworth

(57) ABSTRACT

A multi-function controller mount is configured or adapted for use with a game controller and an electronic device. The mount includes a controller receiver for removably attaching to the game controller. The mount also includes an arm having a first end pivotably attached to the controller receiver at a first pivot axis. The mount also includes a device tray that is pivotably attached to a second end of the arm at a second pivot axis. The device tray is configured for holding the smartphone at an adjustable height and viewing angle. The height and the viewing angle are adjustable through movement or the arm at the first pivot axis and movement of the device tray at the second pivot axis. The mount also includes a lock feature attached to the arm for selectively preventing movement of the arm relative to the controller receiver.

17 Claims, 20 Drawing Sheets

(56) References Cited

U.S. PATENT DOCUMENTS

| | | | |
|---|---|---|---|
| 10,215,333 B2* | 2/2019 | Goldstein | F16M 11/10 |
| 10,222,794 B2* | 3/2019 | Deng | F16M 13/02 |
| 10,286,328 B2* | 5/2019 | Adamenko | A63H 17/00 |
| 10,724,671 B2* | 7/2020 | Peng | G08C 17/00 |
| 10,773,172 B2 | 9/2020 | Stark | |
| 10,946,272 B2* | 3/2021 | Fuchs | A63F 13/21 |
| 11,141,653 B2* | 10/2021 | Kama | A63F 13/98 |
| 11,202,963 B2* | 12/2021 | Esselstrom | F16B 2/12 |
| 11,437,841 B2* | 9/2022 | Gonzalez | H02J 50/10 |
| 11,491,394 B2* | 11/2022 | Gao | A63F 13/24 |
| 2011/0275437 A1 | 11/2011 | Jennings et al. | |
| 2013/0341214 A1 | 12/2013 | King et al. | |
| 2014/0200085 A1* | 7/2014 | Bares | A63F 13/98 463/47 |
| 2015/0018101 A1 | 1/2015 | Schoenith et al. | |
| 2015/0149668 A1 | 5/2015 | Joynes et al. | |
| 2016/0001176 A1 | 1/2016 | Chen | |
| 2016/0030838 A1 | 2/2016 | Hong | |
| 2019/0094853 A1* | 3/2019 | Overall | G05D 1/0038 |
| 2019/0287387 A1* | 9/2019 | Keller | A63H 30/04 |
| 2020/0050291 A1 | 2/2020 | Pellen et al. | |
| 2020/0398170 A1* | 12/2020 | McDole | A63F 13/24 |
| 2021/0291038 A1* | 9/2021 | Guerrero, Jr. | A63F 13/24 |

* cited by examiner

MULTI-FUNCTION CONTROLLER MOUNT

CROSS REFERENCE TO RELATED APPLICATIONS

This application claims priority to U.S. Provisional Patent Application No. 63/042,624, filed Jun. 23, 2020, which is hereby incorporated by reference in its entirety.

BACKGROUND

Personal and portable electronic devices are commonly used for communication, entertainment, gaming, and Internet access, as well as for a variety of other purposes. Examples of personal electronic devices include smartphones, tablet computers, gaming devices, audio players, video players, cameras, portable computers, two-way radios, GPS receivers, and/or other portable devices. As processing power, screen resolution, and other features increase, these electronic devices are being used for an increasingly wide range of purposes. In some situations, these types of electronic devices are used for gaming. Frequently, it is desirable to use an external game controller, keyboard, or other input or peripheral device rather than to provide input directly to the screen or buttons of the electronic device. In some situations, handheld game controllers are used with smartphones and improved mounts are desired for holding the controller and the smartphone.

DETAILED DESCRIPTION

Figure 1:
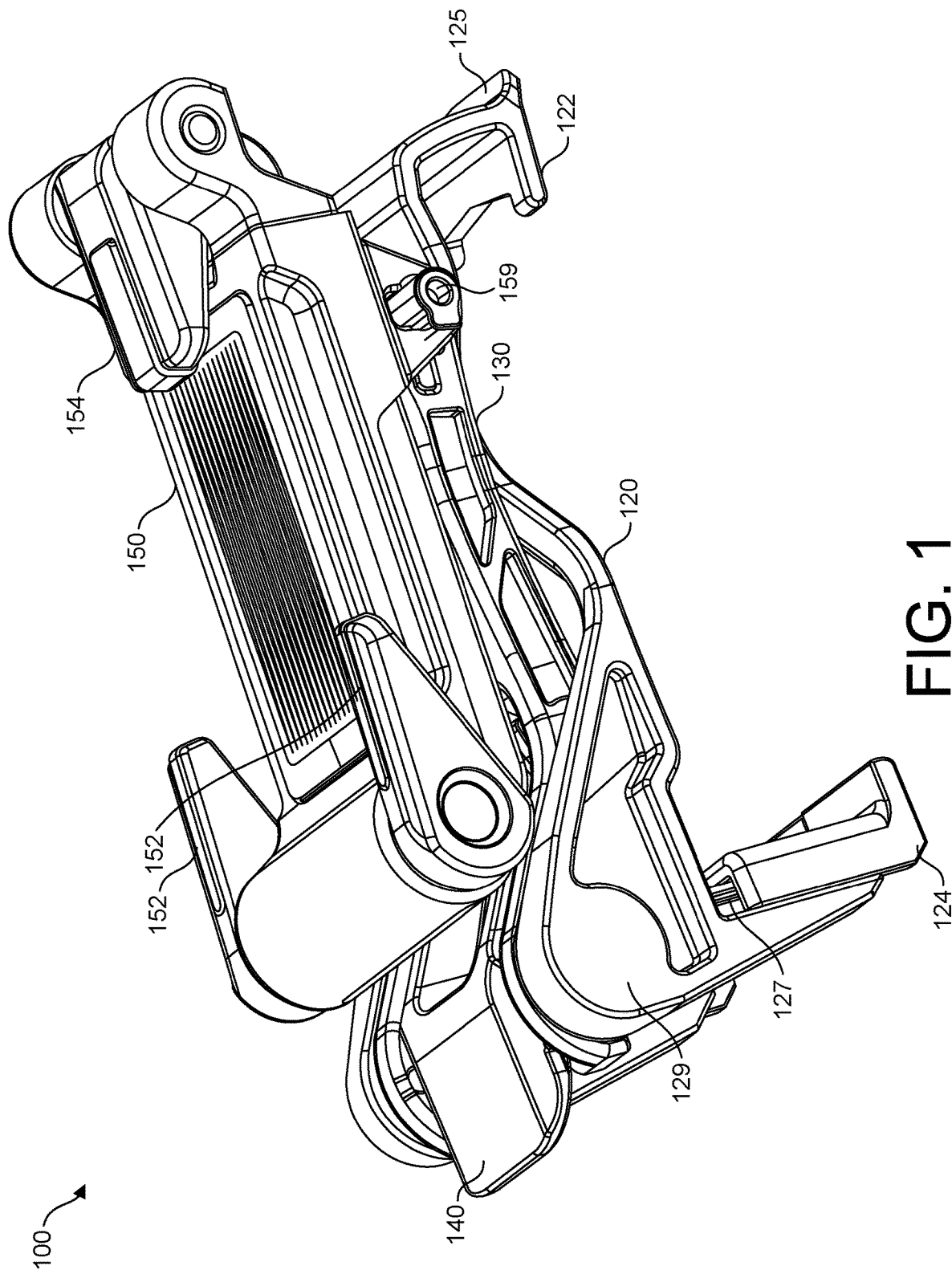
FIG. 1 illustrates a perspective view of a controller mount.

Electronic devices, such as smartphones, are frequently used with external peripherals such as an external game controller, keyboard, or other input device rather than providing input directly to the screen or buttons of the electronic device. In some situations, improved mounts are desired for simultaneously holding a game controller and the smartphone in a preferred and/or adjustable viewing position. In many situations, gamers wish to plays games on a smartphone using the same game controller that they use when playing games on a game console, a full size computer, and/or when using a larger monitor. Therefore, it is desirable to have a controller mount which attaches to both the game controller and the smartphone and also offers multiple degrees of adjustment. It may also be desirable that the apparatus may be used as a stand for the smartphone.

While many of the examples discussed herein are discussed with respect to a smartphone, the apparatuses and techniques disclosed herein are not limited to smartphones and may be used with any processing or display device. While most of the examples discussed herein are explained with respect to a game controller, the apparatuses and techniques disclosed herein are not limited to game controllers and may be used with any type of input or peripheral device.

In one example, a multi-function controller mount is configured or adapted for use with a game controller or other peripheral device, as well as with a smartphone or other electronic device. The multi-function controller mount includes a controller receiver configured for removably attaching to the game controller, wherein controls of the game controller remain accessible and usable when the game controller is removably attached to the controller receiver. The multi-function controller mount also includes an arm having a first end and a second end. The first end of the arm is pivotably attached to the controller receiver at a first pivot axis. The multi-function controller mount also includes a device tray, mount, carrier, or receptacle that is pivotably attached to the second end of the arm at a second pivot axis. The device tray is configured for holding the smartphone at an adjustable height and an adjustable viewing angle relative to the controller receiver. The height and the viewing angle are adjustable through movement or the arm at the first pivot axis and movement of the device tray at the second pivot axis. The multi-function controller mount also includes a lock feature or lock lever attached to the arm. The lock lever or feature has a locked position and an unlocked position. The lock lever is configured to prevent movement of the arm relative to the controller receiver at the first pivot axis when the lock lever is in the locked position and configured to permit movement of the arm relative to the controller receiver at the first pivot axis when the lock lever is in the unlocked position The arm and device tray may also optionally be removed and used as a stand for the smartphone separate from the controller receiver.

FIG. 1 illustrates a perspective view of a controller mount 100. In FIG. 100, controller mount 100 is in a stowed position. Controller mount 100 includes a controller receiver 120, an arm 130, a lock lever 140, and a device tray 150.

Figure 3:
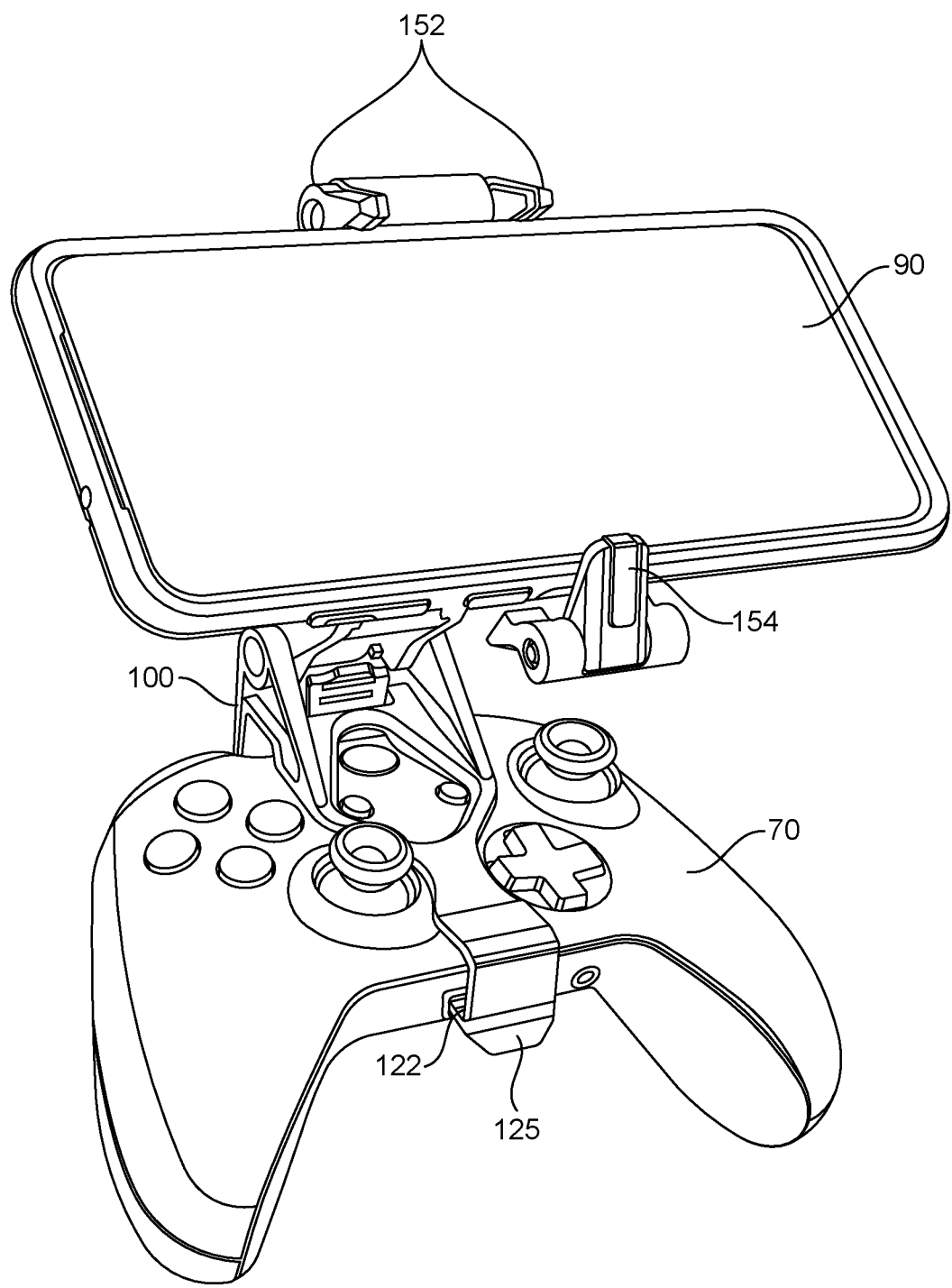
FIG. 3 illustrates the controller mount of FIG. 1 with a game controller and a smartphone installed.

Controller receiver 120 includes a clip 122 for removably attaching controller receiver 120 to a game controller. Clip 122 may be any kind of structure to flexibly engage a ledge, edge, lip, ridge, edge, recess, hole, or other feature of the game controller to hold the game controller. One example is illustrated in FIG. 3. Clip 122 may rely on an interference fit, a friction fit, a resilient characteristic, and/or a springing behavior. Clip 122 may include a tab 125 for flexing or springing clip 122. Controller receiver 120 may also removably attach to the game controller using a fastener, a snap, a tab, an adhesive, and/or a temporary adhesive. Controller receiver 120 may also include another clip, such as movable clip 124 also for removably attaching to the game controller. Movable clip 124 is adjustable to different positions through movement along a track 127. This movement enables controller mount 100 to fit game controllers of different sizes and/or shapes.

Controller mount 100 also includes arm 130 which is pivotably attached to controller receiver 120 at arm pivot axis 129, which may include a hinge. Device tray 150 is pivotably attached to arm 130 at tray pivot 159, which may also be described as a tray pivot axis. Device tray may also be referred to as a device mount. Tray pivot 159 may be or include a hinge. Tray pivot 159 may have a locking feature and/or may be a friction hinge having a specified amount of inherent resistance or stiction which requires a specified amount of torque to overcome. The discussion of subsequent figures will explain the relative movement of these elements in greater detail.

Figure 2:
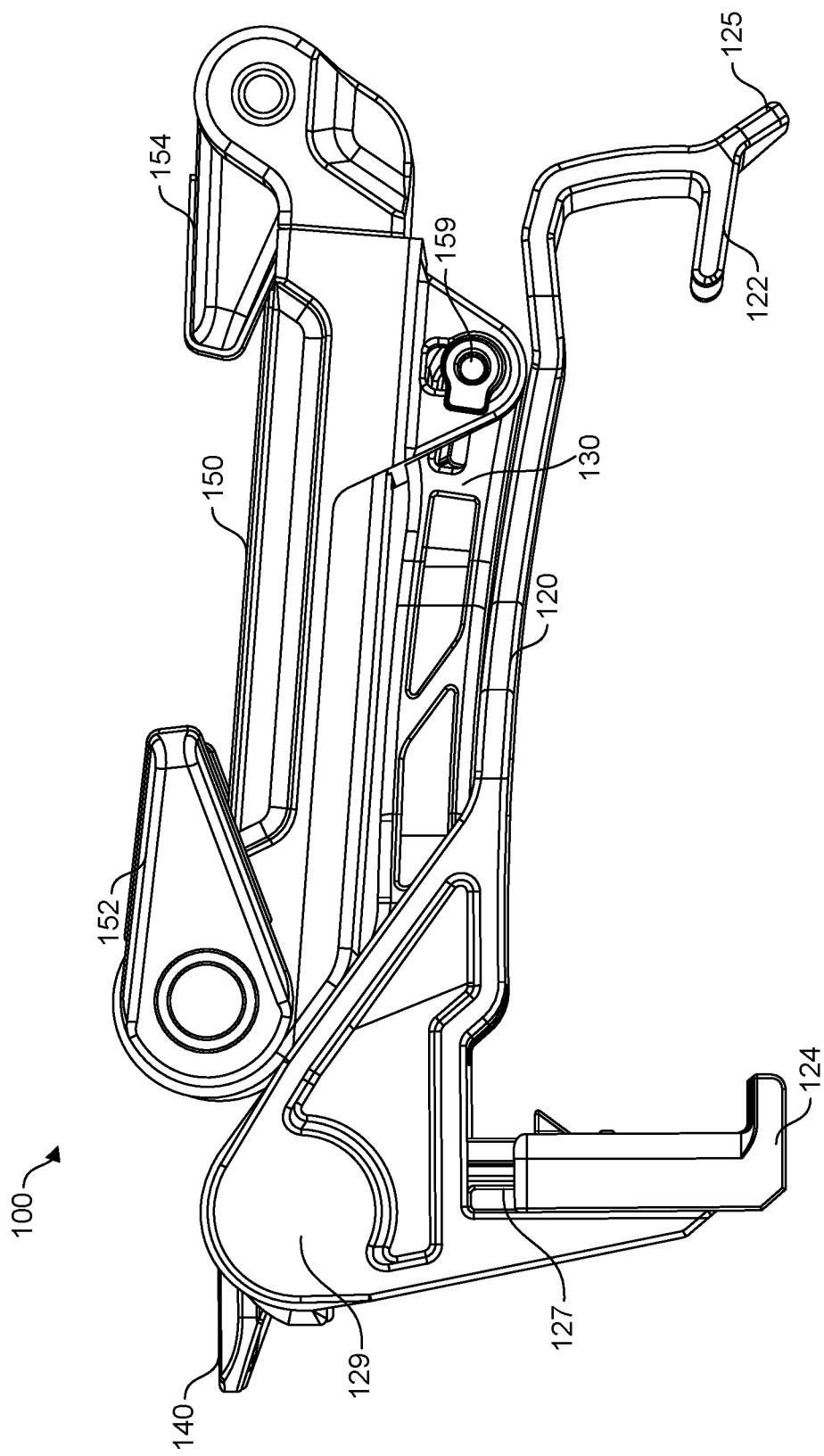
FIG. 2 illustrates a side view of the controller mount of FIG. 1.

Device tray 150 may include one or more arms, such as device arm 152 and device arm 154 for temporarily and removably holding the smartphone, or other electronic device, on device tray 150. Device arms 152 and 154 may be spring loaded, ratcheting, and/or may have a frictional behavior. The position and size of device arms 152 and 154 may be chosen to support a variety of sizes of smartphones and/or accommodate smartphones both with and without protective cases or covers. Controller mount 100 may also include a locking feature, such as lock lever 140, for selectively locking or prohibiting the movement of arm 130 relative to controller receiver 130. More or fewer device arms are possible. In other examples, a smartphone or a smartphone case may be attached to device tray 150 using an attachment mechanism or a magnet on a back surface of the smartphone or smartphone case. FIG. 2 illustrates a side view of controller mount 100 of FIG. 1.

In some examples, device tray 150 may be telescoping or extendable in one or more directions to accommodate a larger range of device sizes. In some examples, the telescoping or extending feature may be spring-loaded to more readily hold a range of devices of different sizes and/or devices in protective cases. In some examples, a constant force spring may be used. In other examples, device tray 150 may include a tacky, grippy, or non-slip surface to reduce chances of movement of the smartphone on device tray 150.

FIG. 3 illustrates controller mount 100 with a game controller 70 and smartphone 90 removably mounted or attached. Smartphone 90 may be any type of phone, tablet computer, gaming device, video player, camera, portable computer, and/or display device for displaying information related to the use of game controller 70. Game controller 70 may be any type of input device used with video games or entertainment systems to provide input to a video game, typically to control an object or character in the game. Game controller 70 may be any type of controller, such as an XBOX controller, that may also be used with a console system, a full size computer, a full sized display, a television, and/or any other gaming device or display.

Game controller 70 may communicate with smartphone 90 through a wireless and/or a wired connection. As described in further detail below, controller mount 100 can be adjusted to provide a preferred viewing angle and position for smartphone 90 when game controller 100 is held.

Figure 4:
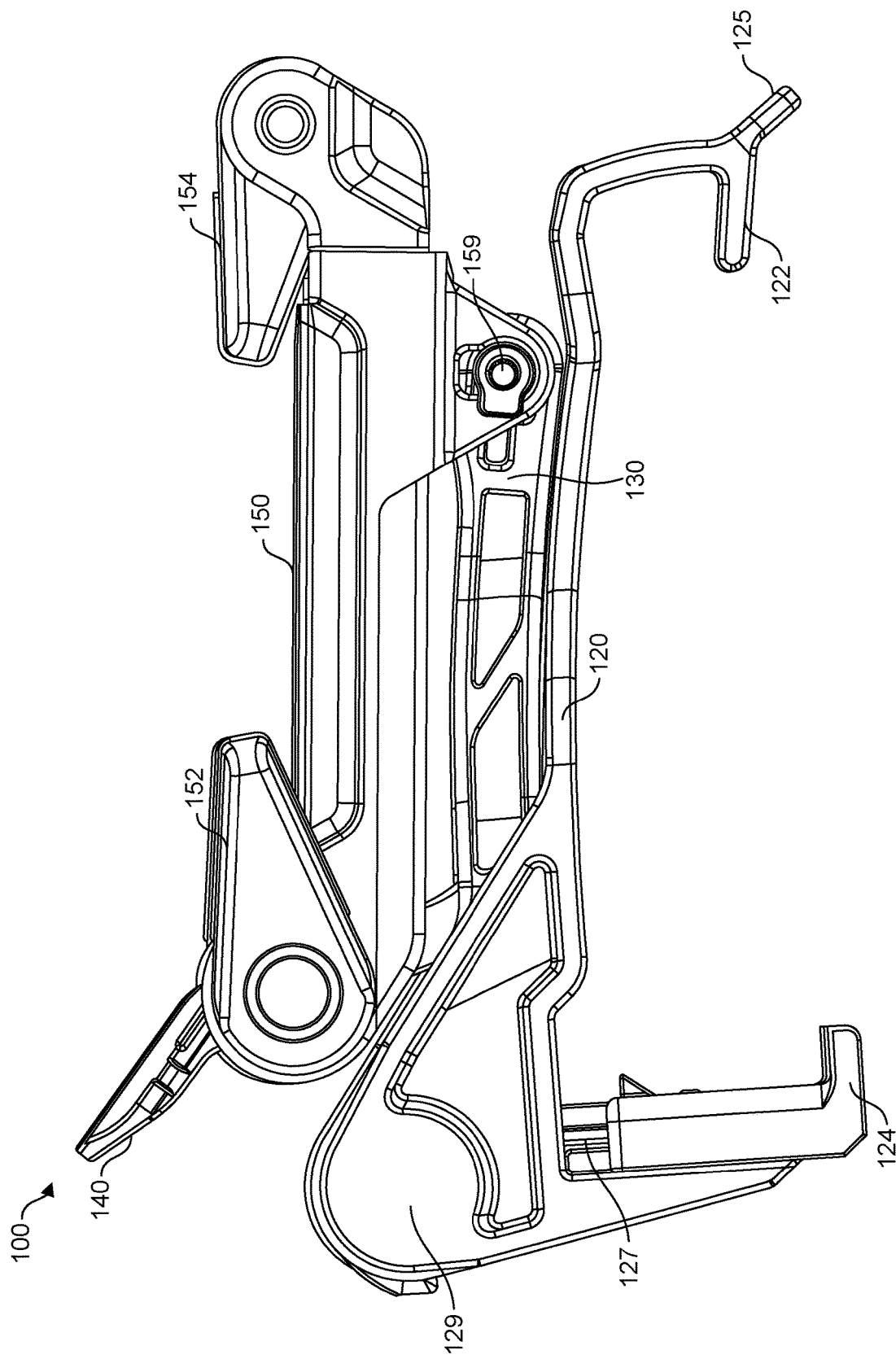
FIG. 4 illustrates the side view of FIG. 2 with a lock lever in an unlocked position.

FIG. 4 illustrates a side view of controller mount 100 similar to FIG. 2, but with lock lever 140 moved upward into an unlocked position. While a particular implementation of lock lever 140 is discussed herein, the improvements disclosed herein are not limited to any particular type, shape, or implementation of locking mechanism. In this example, lock lever 140 pivots from arm 130 and is moved into the unlocked position illustrated in FIG. 4 when it is desired to move arm 130 to a different position.

Figure 5:
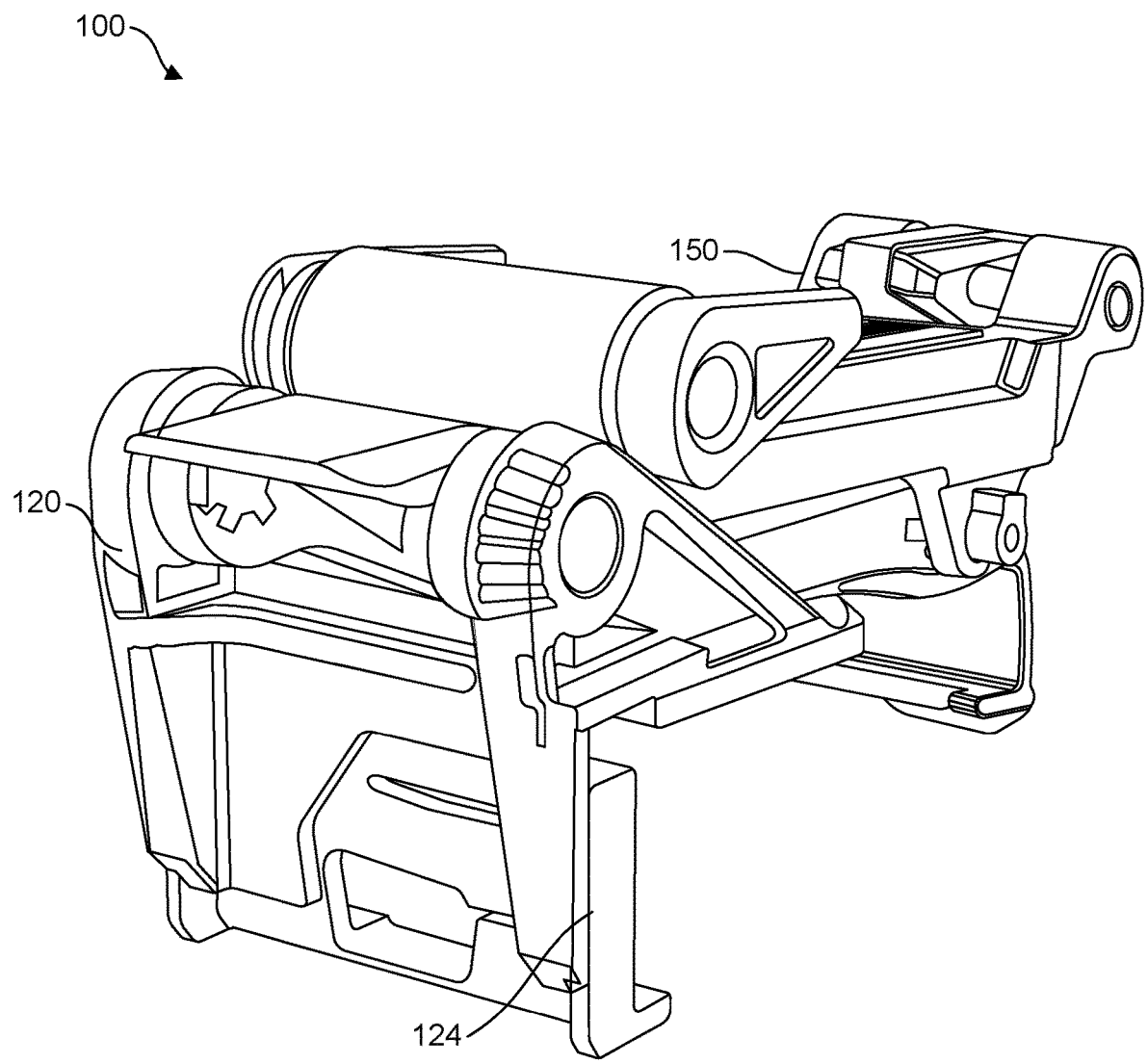
FIG. 5 illustrates a movable controller clip attached to the controller mount of FIG. 1.

FIG. 5 illustrates a movable clip 124 on controller mount 100 enabling controller mount 100 to alternately hold controllers other than game controller 70 which may have different shapes and/or sizes. In other examples, controller mount 100 may be used with one or more other types of peripheral or input devices. An additional adapter may be attached to controller mount 100 to accommodate other devices. Movable clip 124 moves to different positions along a track 127 as illustrated by the arrow in FIG. 5. Clip 122 may also have adjustable features in place of, or in addition to, movable clip 124. Movable clip 124 may also adjust to accommodate a protective case, covering, or shell which may be installed on game controller 70.

Figure 6:
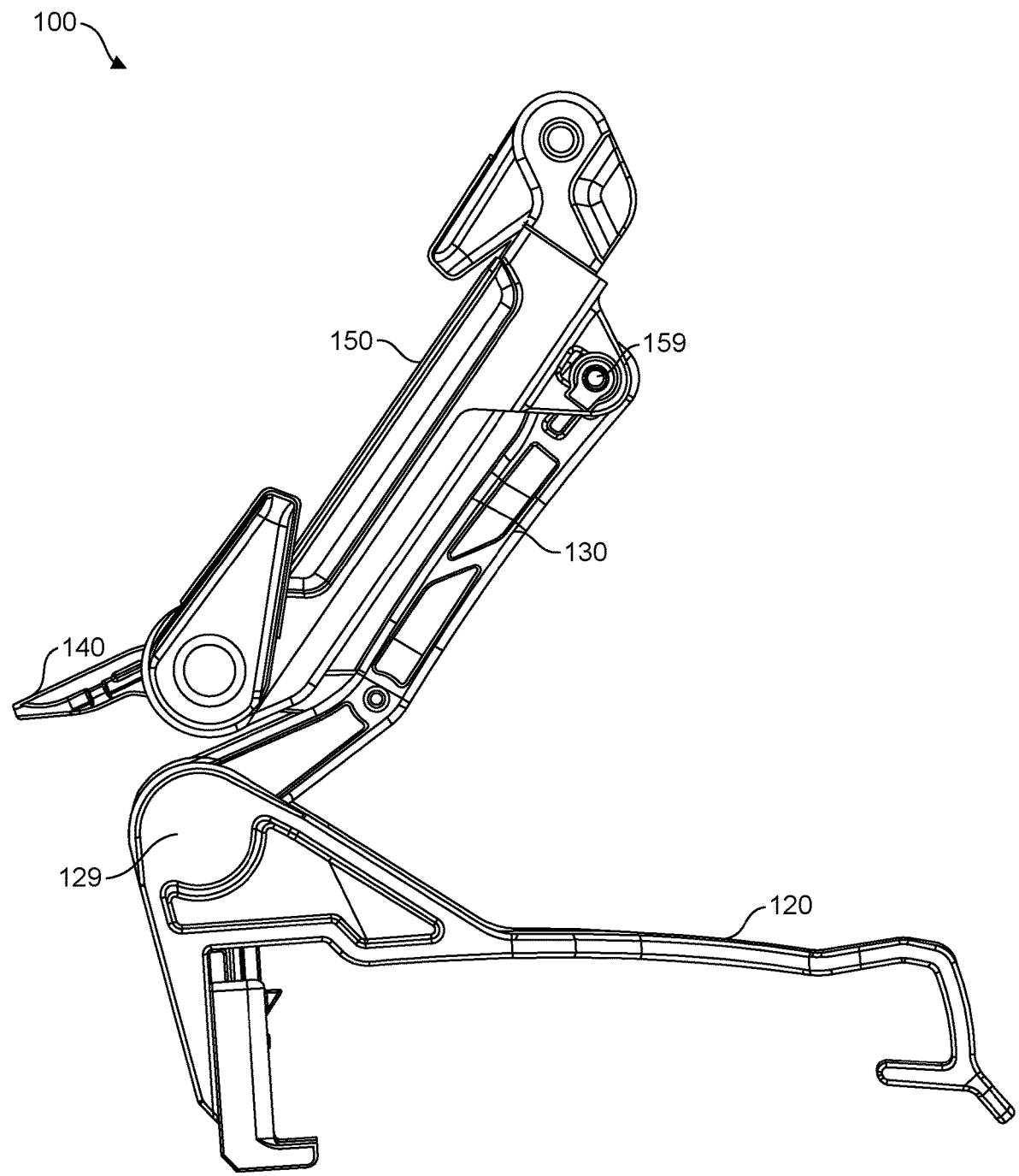
FIG. 6 illustrates the side view of FIG. 2 with the arm in a partially extended position.
Figure 7:
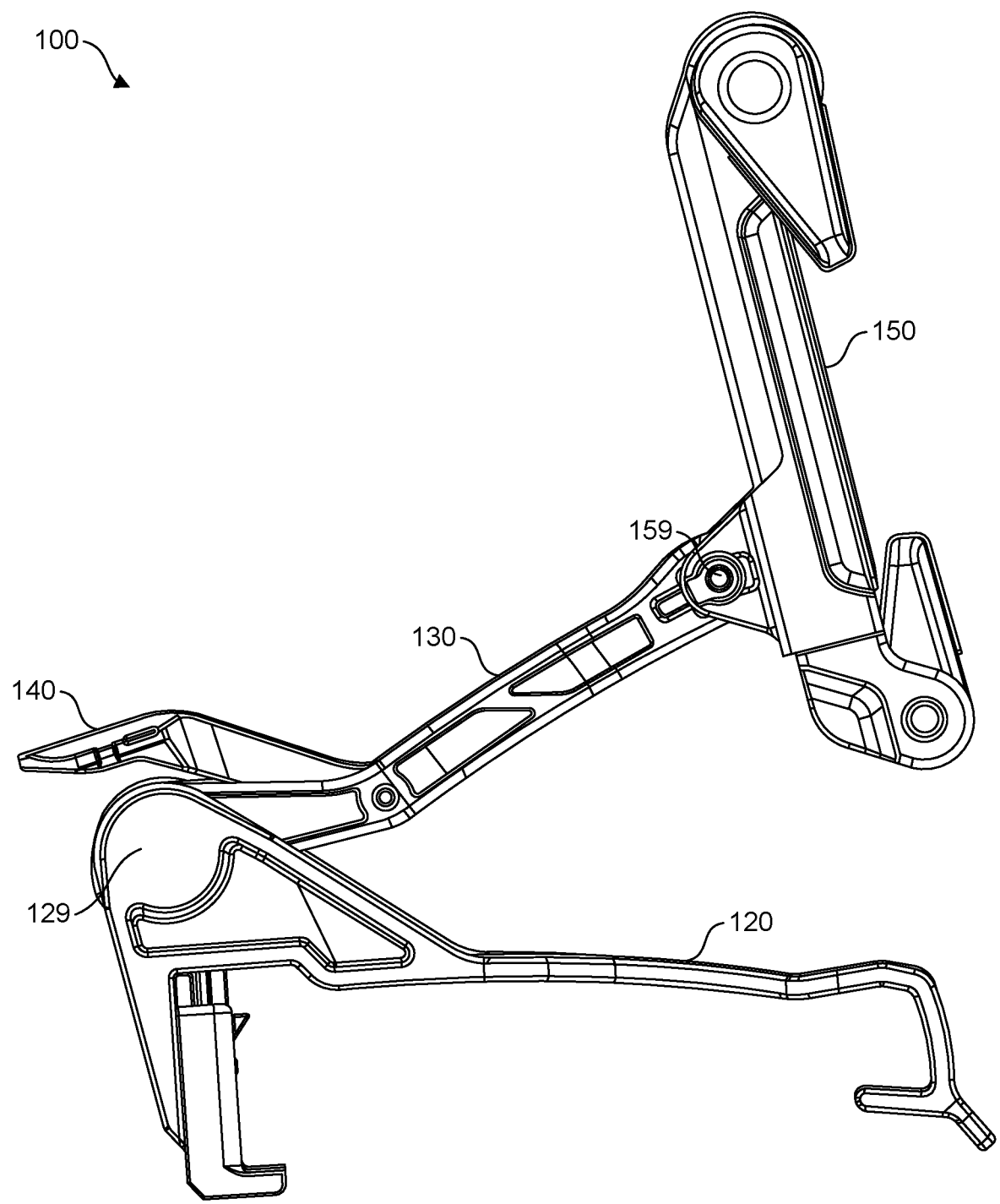
FIG. 7 illustrates the configuration of FIG. 6 with the device tray in an extended position.
Figure 8:
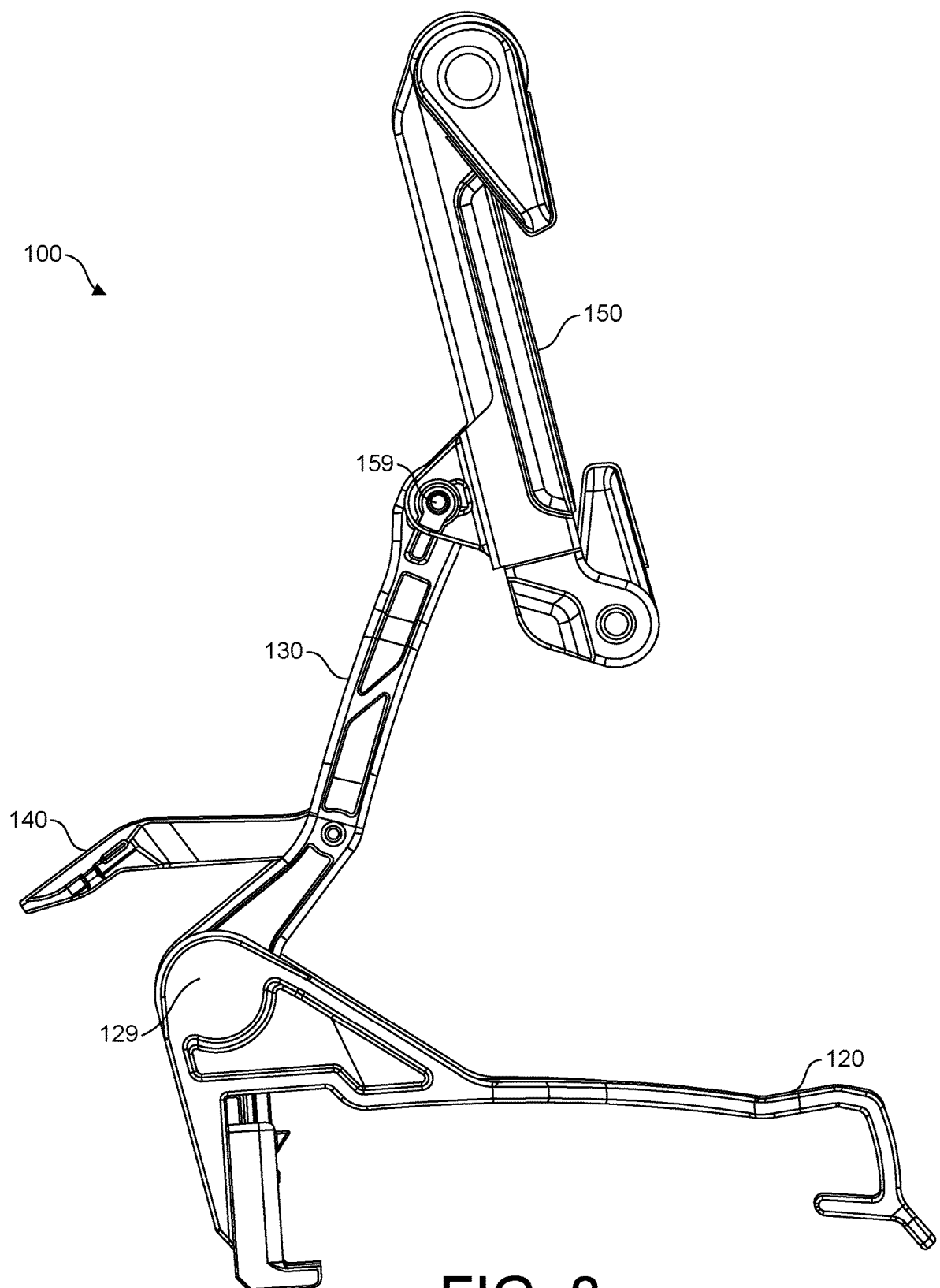
FIG. 8 illustrates the configuration of FIG. 7 with the arm further extended.
Figure 9:
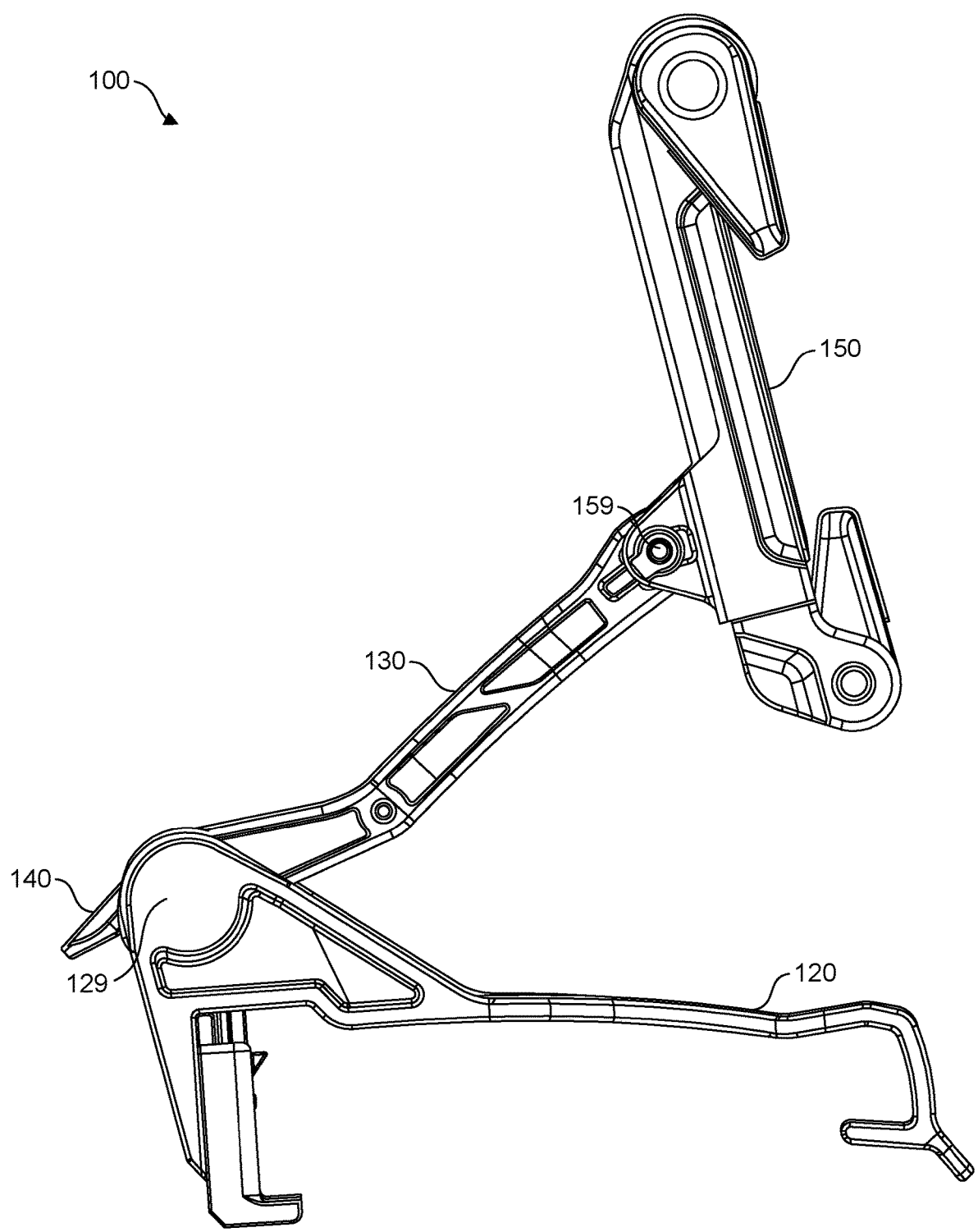
FIG. 9 illustrates the configuration of FIG. 7 with the lock lever in the locked position.
Figure 10:
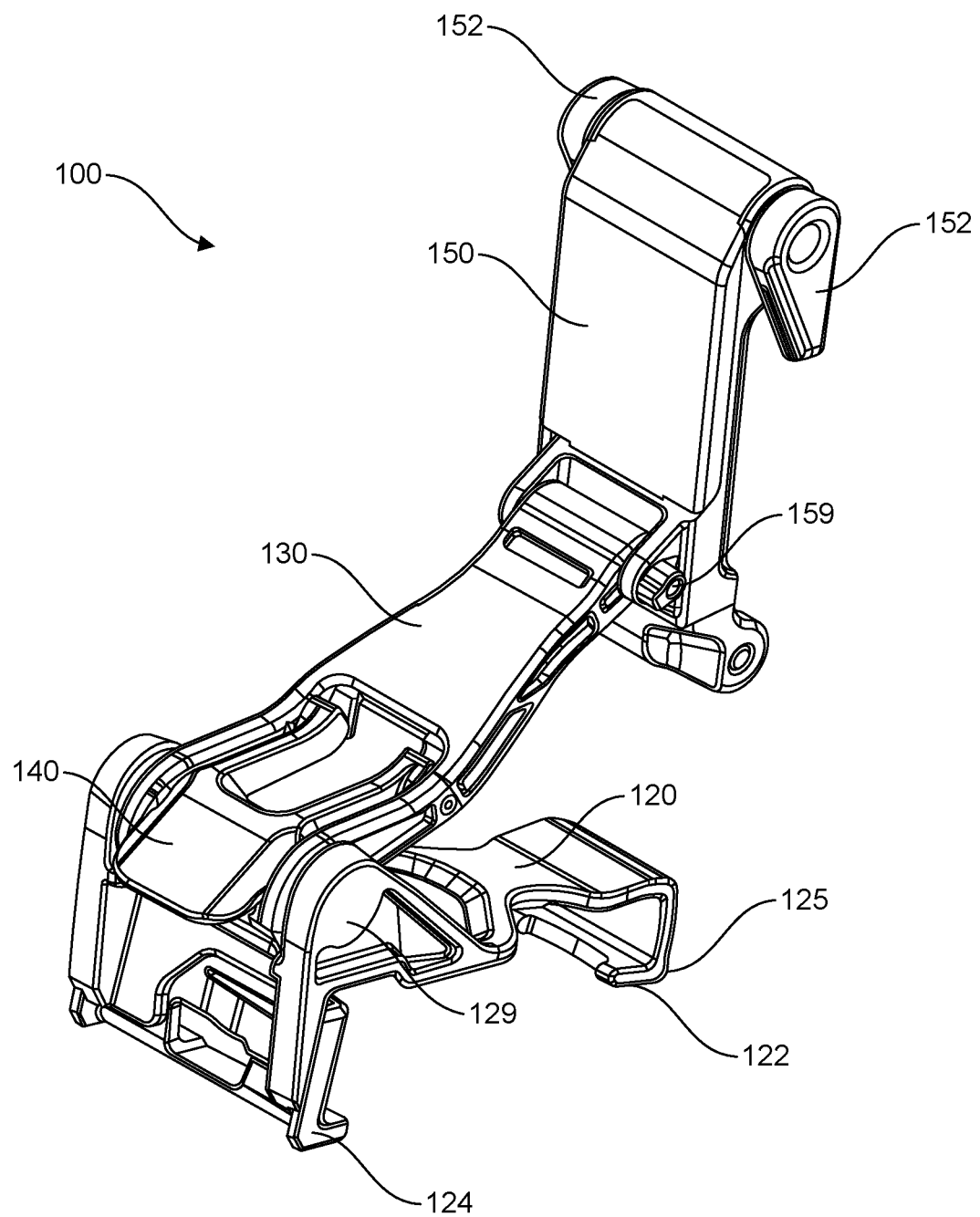
FIG. 10 illustrates a rear perspective view of the configuration of FIG. 9.

After lock lever 140 is moved to the unlocked position illustrated in FIG. 4, arm 130 may be pivoted upward, extended, or partially extended as illustrated in FIG. 6. FIG. 7 illustrates device tray 150 pivoted to an extended or use position after arm 130 has been pivoted upward. This occurs based on relative movement between device tray 150 and arm 130 at tray pivot 159. FIG. 7 also illustrates lock lever 140 returned to the lock position to temporarily hold arm 130 in the illustrated position. FIG. 8 illustrates lock lever 140 having been unlocked or released again and arm 130 moved to an alternate viewing position or angle. FIG. 9 illustrates the return of arm 130 to a position similar to the position of FIG. 7 with lock lever 140 returned to the lock position. FIG. 10 illustrates a rear perspective view of the configuration of FIG. 9.

Figure 11:
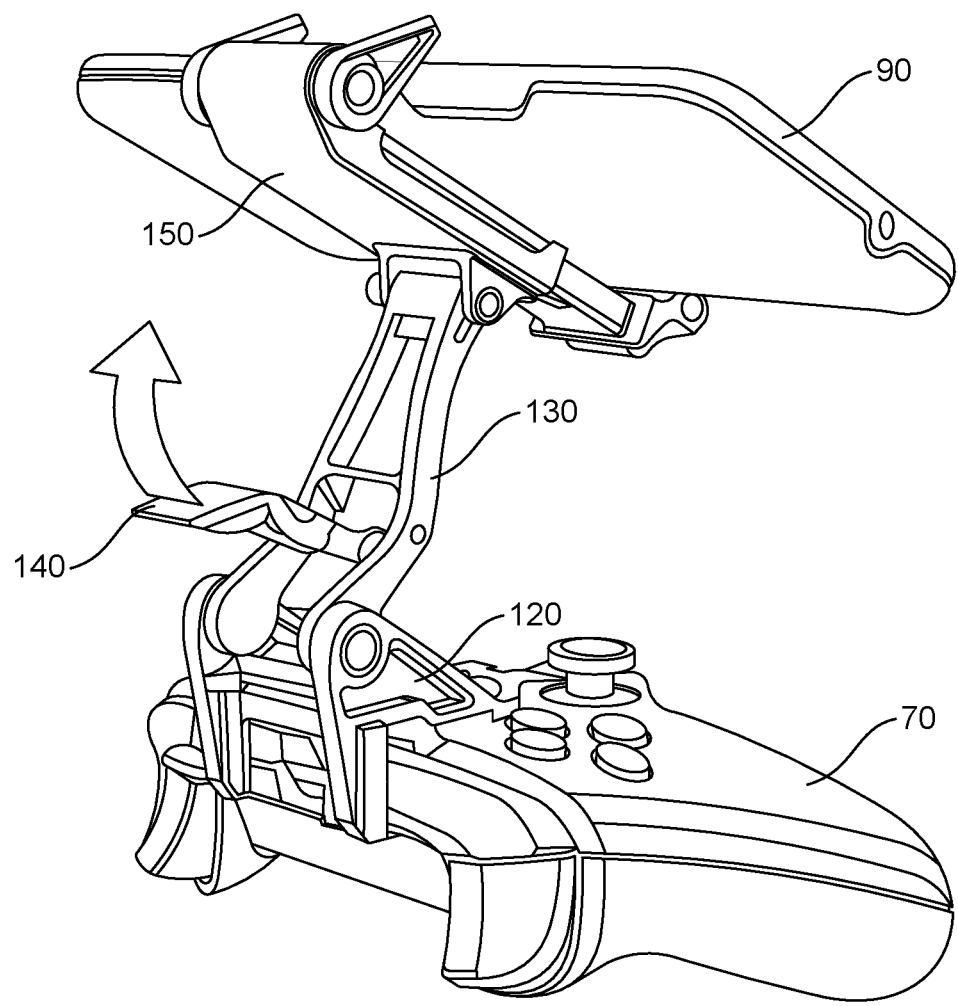
FIG. 11 illustrates a rear perspective view of the configuration 3 and the removal of the arm from the controller receiver.

FIG. 11 illustrates removal of arm 130 from controller receiver 120 when lock lever 140 is in the unlocked position. As illustrated by the arrows in FIG. 11, arm extensions 132A and 132G are squeezed, bent, or flexed toward each other by applying an external force. Once arm extensions 132A and 132G are deflected a sufficient amount, the sub assembly including arm 130 and device tray 150 can be separated from the controller receiver 120.

Figure 12:
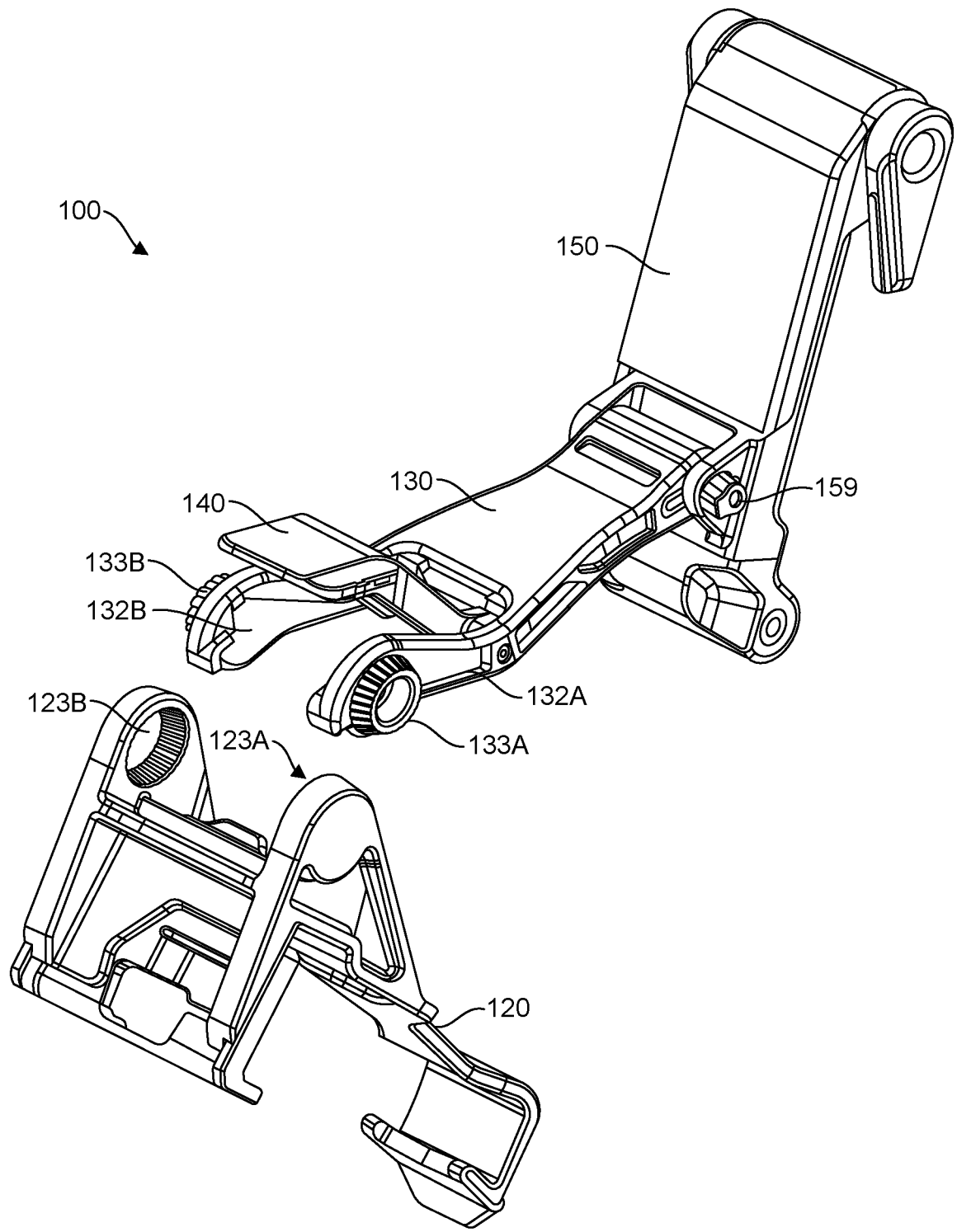
FIG. 12 illustrates the configuration of FIG. 10 with the arm removed from the controller receiver.

FIG. 12 illustrates a rear view of controller receiver 120 with arm 130 removed. As illustrated, conical hubs 133A and 133B are attached to arm extensions 132A and 132G, respectively, and have conical or tapered shapes. As discussed in further detail with respect to FIG. 13, controller receiver 120 includes hub receiver 123A and 123B for receiving conical hubs 133A and 133B, respectively. Hub receivers 123A and 123B may also be conically shaped to receive and mate with conical hubs 133A and 133B, respectively. In some examples, the hubs and hub receivers may be reversed. Other engagement mechanisms are possible.

Figure 13:
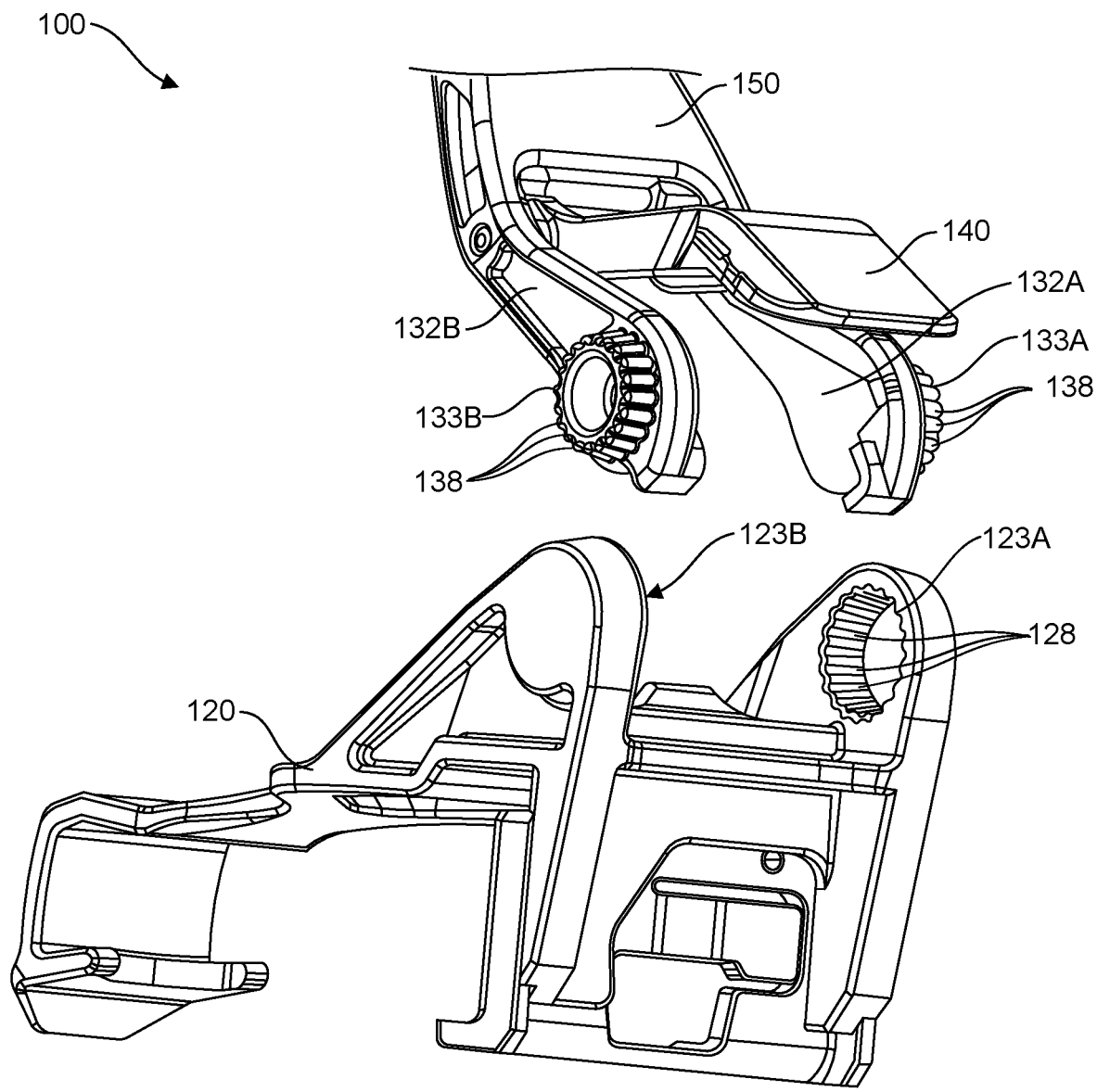
FIG. 13 illustrates an alternate and close-up view of the configuration of FIG. 12.

FIG. 13 illustrates an alternate close-up view of a portion of the configuration illustrated in FIG. 12. Each of conical hubs 133A and 133B includes a plurality of splines or protrusions 138. Each of hub receiver 123A and 123B include a plurality of splines or recesses 128 that correspond, mate, and/or engage with splines 138 of conical hubs 133A and 133B, respectively. When the splines are engaged, arm 130 cannot rotate relative to controller receiver 120. Since conical hubs 133A and 133B and receivers 123A and 123B are conically shaped, arm extensions 132A and 132B must be flexed or squeezed together a specified distance before the splines are sufficiently disengaged to rotate arm 130.

The configuration illustrated in FIG. 13 forms discrete detents or steps to which arm 130 can be moved or rotated. This configuration also provides that arm 130 does not readily move of fall as soon as lock lever 140 is moved to the unlocked position. The assembly may also be described as having a ratcheting behavior when lock lever 140 is in the unlocked position and a sufficient force is applied to arm 130. When lock lever 140 is in the locked position, splines 128 of hubs 133A and 133B are engaged with receivers 123A and 123B and cannot be flexed toward each a sufficient distance for disengagement, thereby keeping arm 130 in place. Other spline layouts and configurations are possible.

Figure 14:
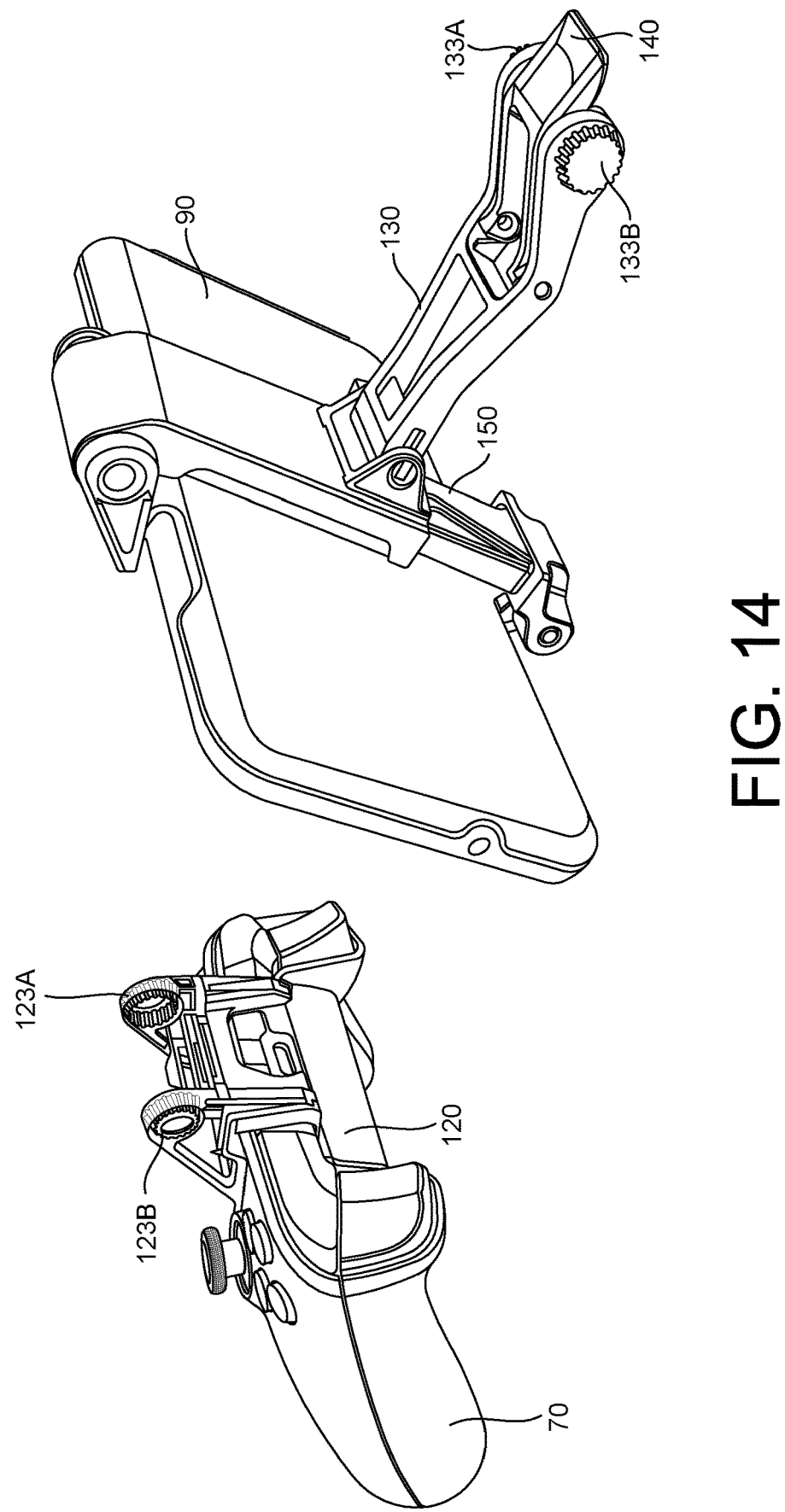
FIG. 14 illustrates the configuration of FIG. 11 with the arm and device tray used as a stand separate from the controller receiver.
Figure 15:
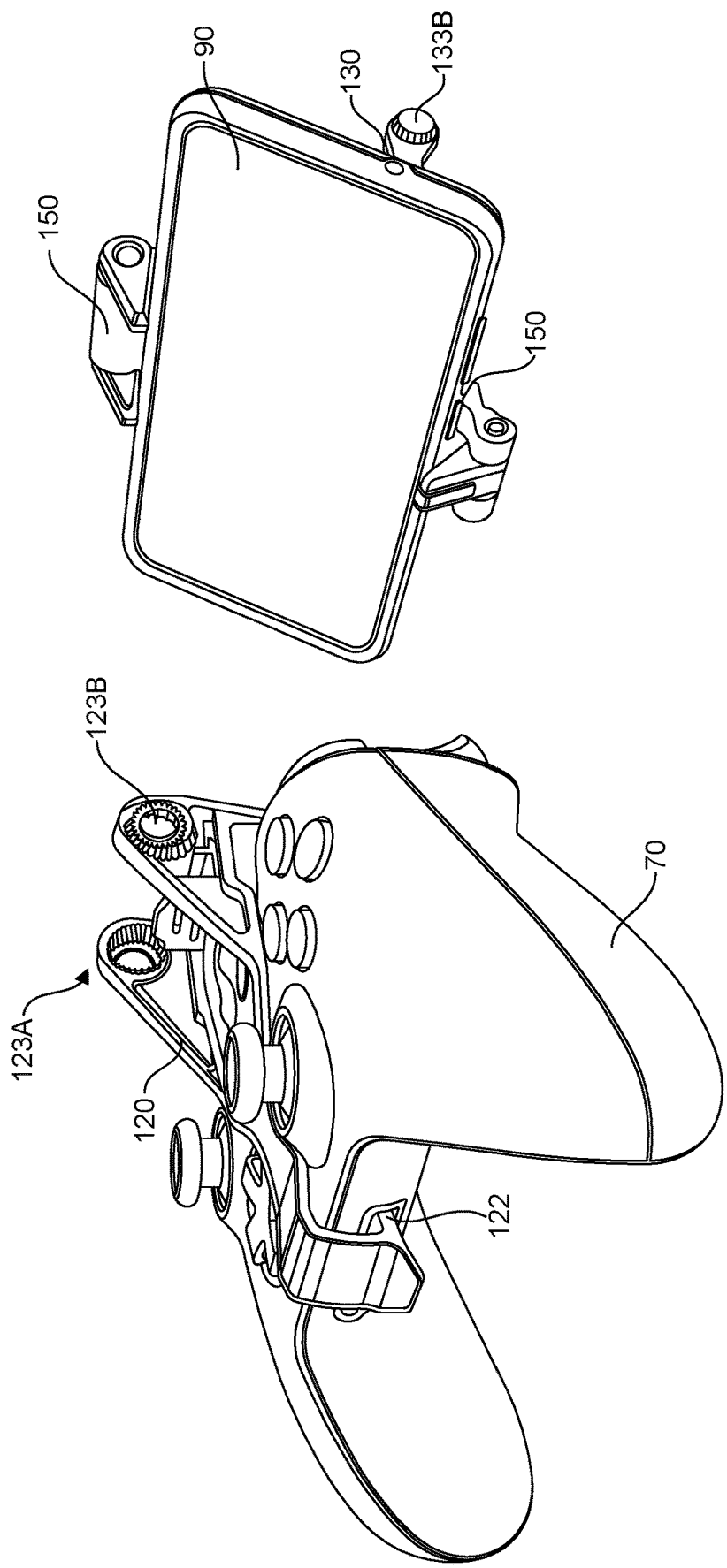
FIG. 15 illustrates an alternate view of the configuration of FIG. 14.

FIG. 14 illustrates the configuration of FIG. 11 with the sub-assembly including arm 130 and device tray 150 used as a stand separate from controller receiver 120. In other words, the sub-assembly that includes arm 130 and device tray 150 can be used as an adjustable stand for smartphone 90 when they are placed on a table or other substantially horizontal surface. When a user desires to again use the devices in another configuration, such as while holding the game controller, arm 130 can simply be reattached to controller receiver 120 and game controller 70 to return to the original configuration. FIG. 15 illustrates an alternate view of the configuration illustrated in FIG. 14.

Figure 16:
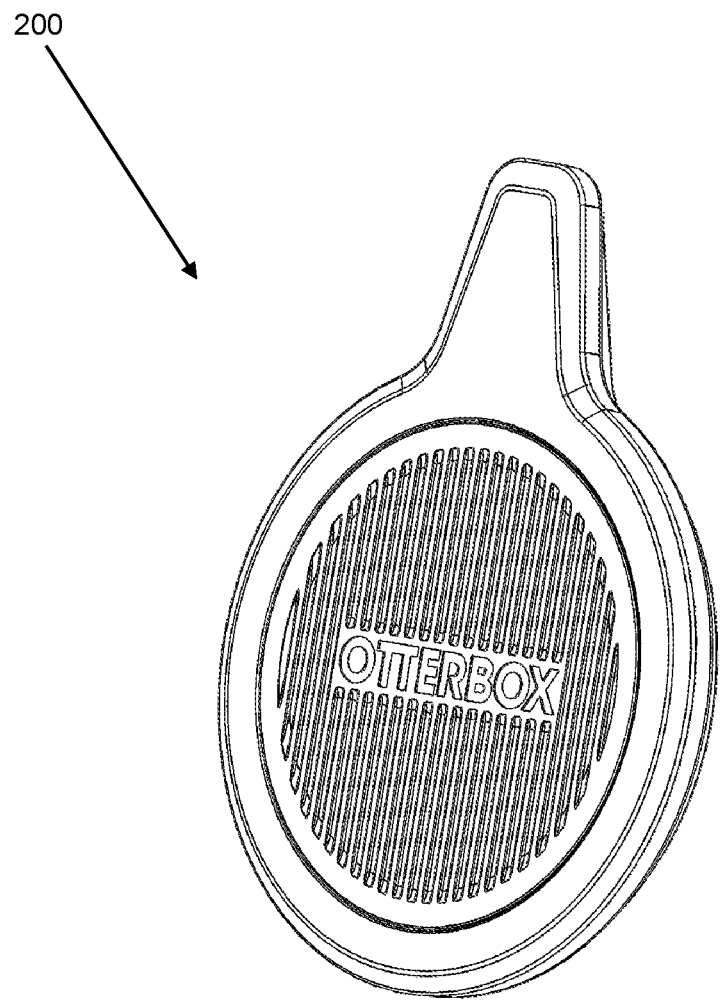
FIG. 16 illustrates a device mount for use with a controller mount.
Figure 17:
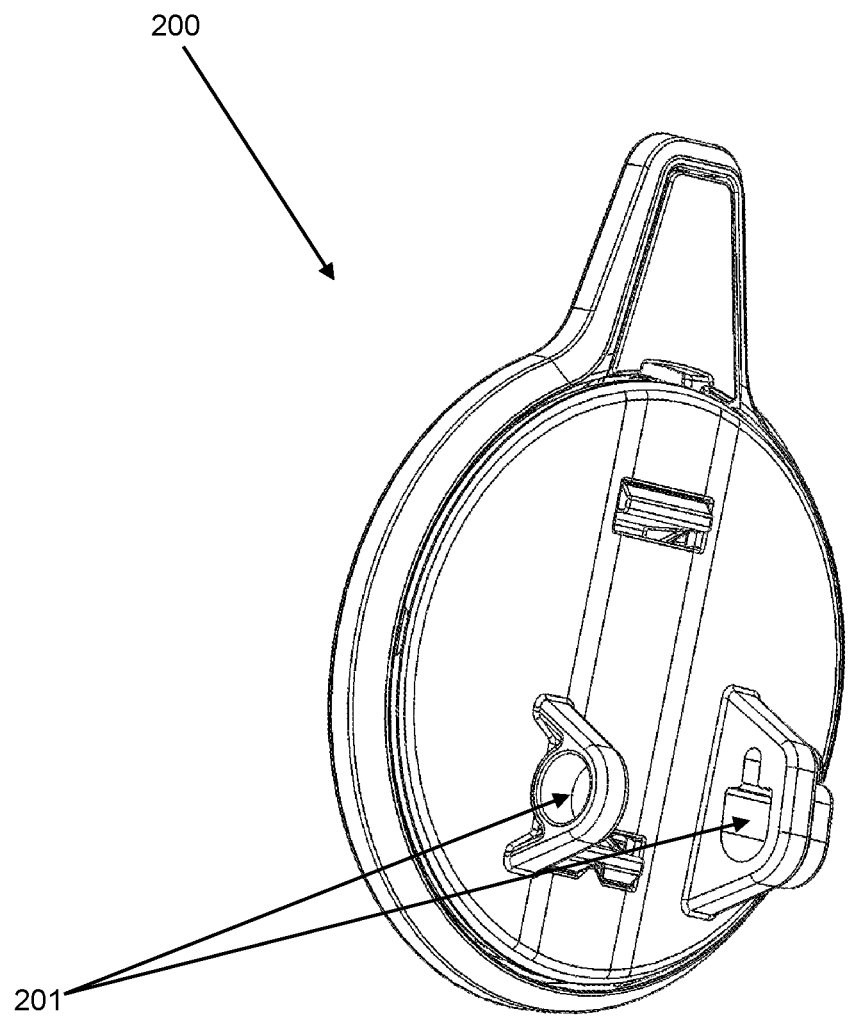
FIG. 17 illustrates a back view of the device mount of FIG. 16.

FIG. 16 illustrates a device mount 200 for use with any of the controller adapters or controller mounts disclosed herein. Device mount 200 may be used as an alternative to or in place of device tray 150 as a means for holding or temporarily retaining an electronic device, a tablet computer, or a display device. FIG. 17 illustrates a back view of device mount 200. Device mount 200 includes attachment points 201 which may be used to attach device mount 200 to arm 130 at tray pivot 159 in a manner similar to that used for device tray 150. Other attachment and/or pivot configurations are possible.

Figure 18:
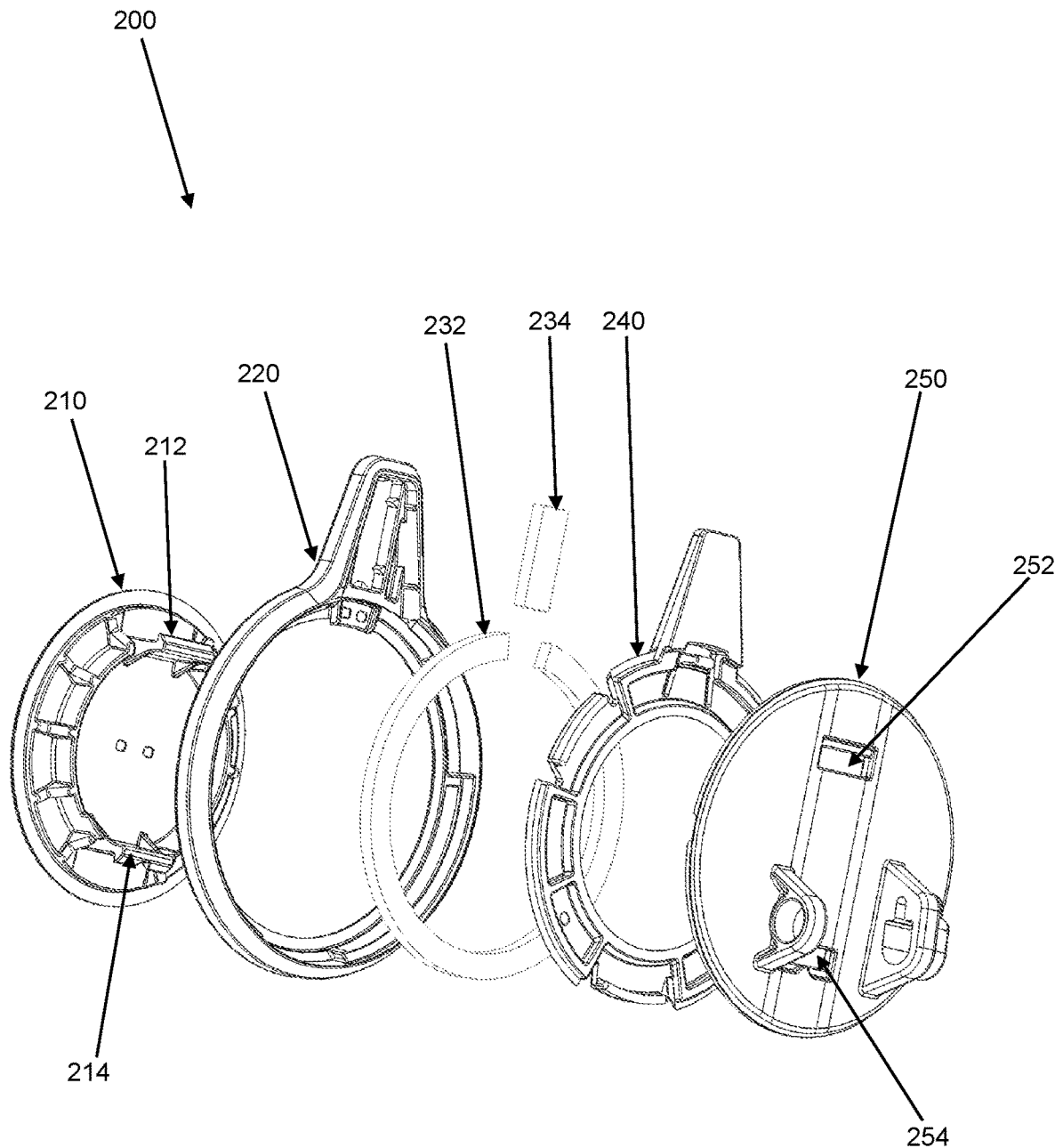
FIG. 18 illustrates an exploded view of the device mount of FIG. 16.

FIG. 18 illustrates an exploded view of an assembly that makes up device mount 200. Device mount 200 includes cap 210 rotational body top 220, ring magnet 232, alignment magnet 234, rotational body bottom, and base 250. When assembled, ring magnet 232 and alignment magnet 234 are captured or enclosed when rotational body top 220 is attached to rotational body bottom 240. Rotational body top 220 may be attached to rotational body bottom 240 using one or more known methods including using a snap fit, a friction fit, an interference fit, clips, tabs, screws, threads, and/or an adhesive.

The illustrated shape, size, configuration, and orientation of ring magnet 232 and alignment magnet 234 are compatible with a standard magnetic interface, such as APPLE MAGSAFE. However, other shapes, sizes, configurations, quantities, and/or orientations are possible in order to be compatible with other devices or systems. Ring magnet 232 and alignment magnet 234 are configured or adapted to magnetically attract one or more magnets or metallic elements in a smartphone, a tablet computer, an electronic device, and/or a case for one of these items. The purpose is to provide a convenient mounting system which temporarily retains the device. The attraction of alignment magnet 234 to a corresponding element provides a repeatable and consistent orientation of the electronic device on device mount 200.

The assembly including rotational body top 220, rotational body bottom 240, ring magnet 232, and alignment magnet 234 is rotatably captured when cap 210 is attached to base 250. Cap 210 is attached when clips 212 and 214 engage clip receivers 252 and 254, respectively. Cap 210 and/or base 250 may include flexible elements which contact the assembly such that the assembly is rotatable relative to base 250 but tends to stay in place unless a sufficient force is applied. Cap 210 and/or base 250 may also include one or more dimples, protrusions, raised surfaces, channels, recesses, or detents which further tend to keep the assembly in particular preferred rotational positions. In one example, the one or more dimples, protrusions, raised surfaces, channels, recesses, or detents may establish preferred rotational locations which have a 90 degree relationship to one or more other preferred rotational locations. Device mount 200 enables the rotational assembly, and possibly also a magnetically attached electronic device, to be rotated relative to base 250. Other configurations are possible.

Figure 19:
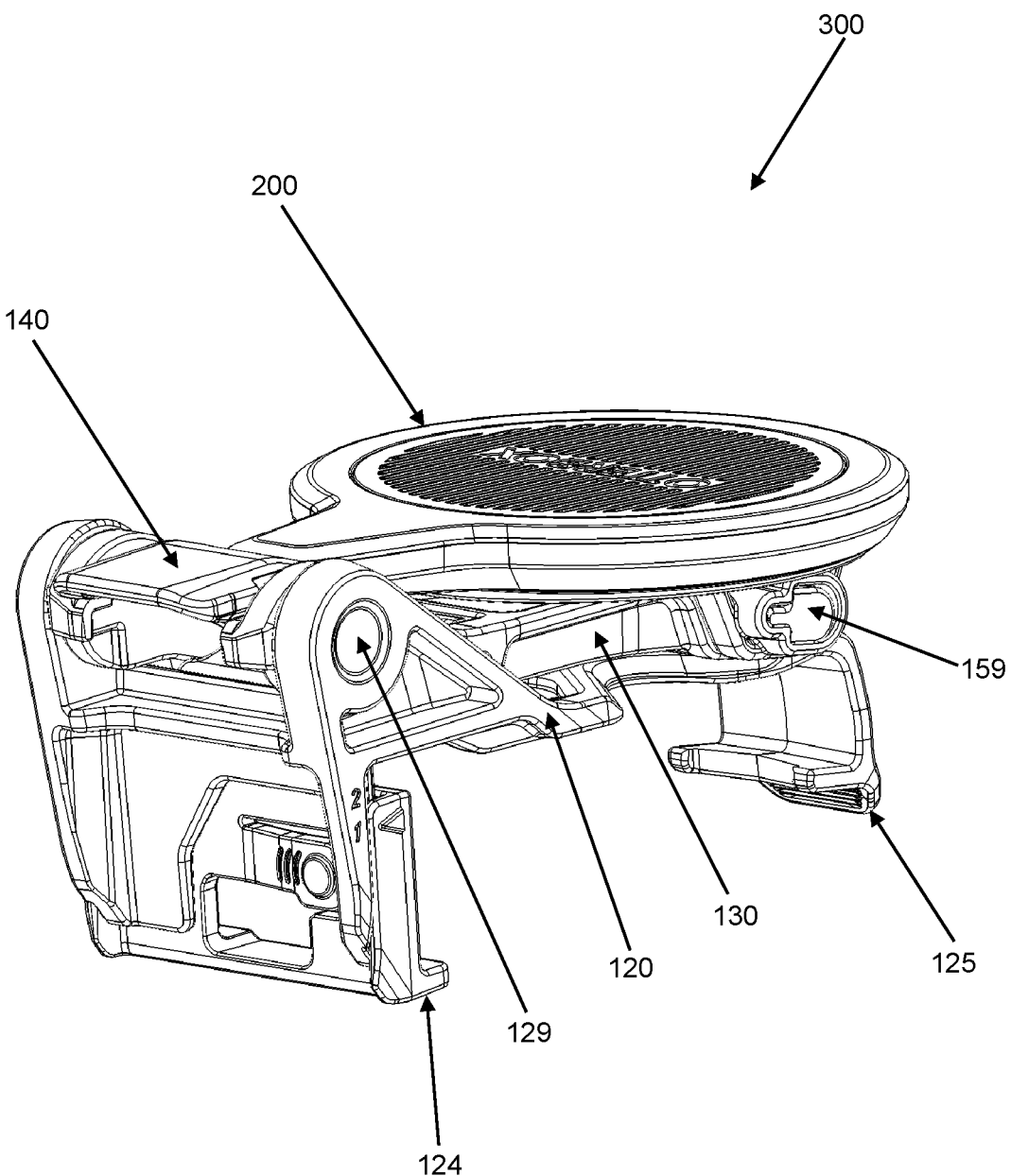
FIG. 19 illustrates an alternative controller mount including the device mount of FIG. 16.
Figure 20:
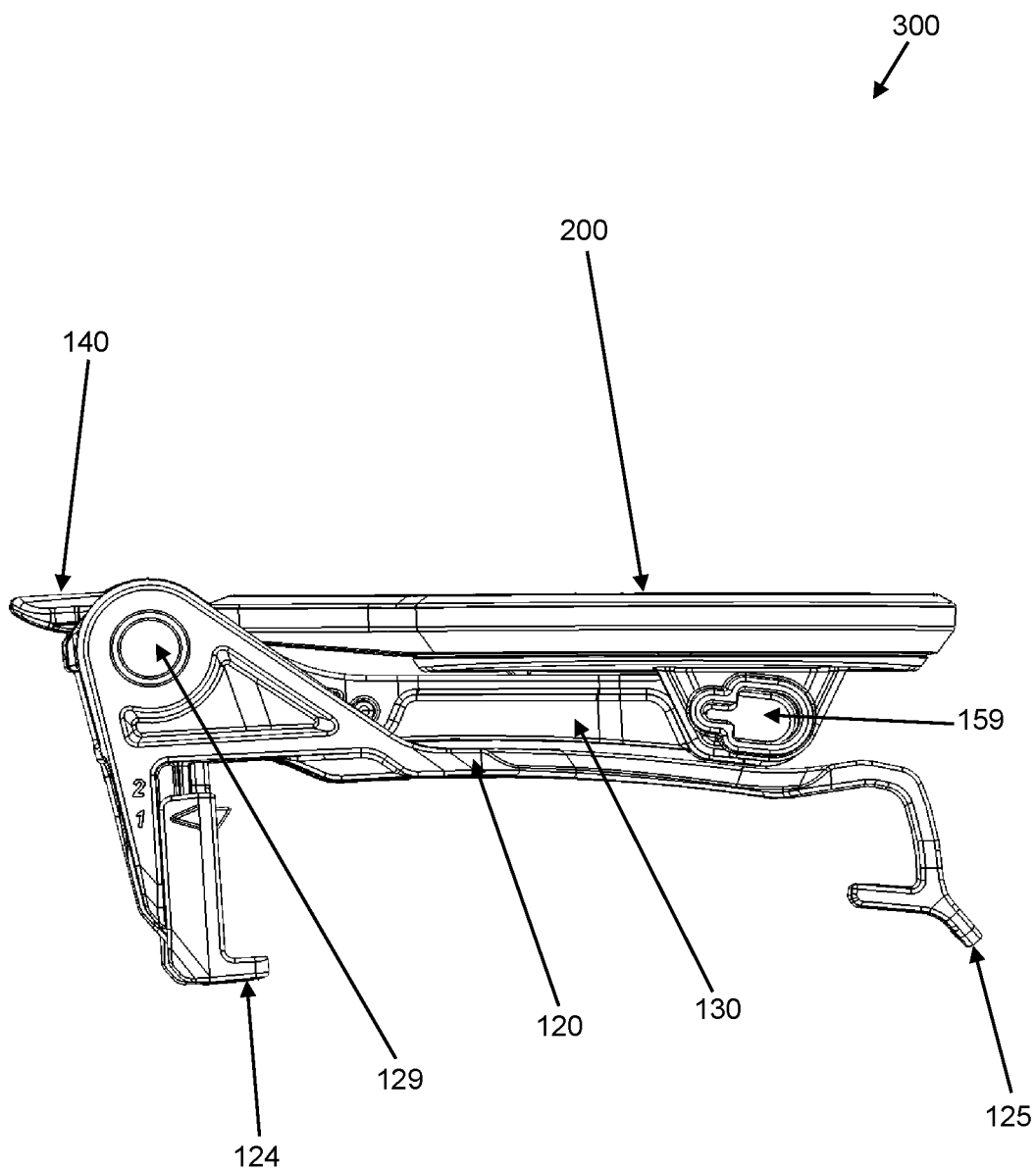
FIG. 20 illustrates another view of the alternative controller mount of FIG. 19.

FIG. 19 illustrates a controller mount 300 which includes device mount 200. The other components of controller mount 300 may be any of the same components as those of controller mount 100. Controller mount 300 may be manipulated, positioned, oriented, and/or utilized in any of the ways described with respect to controller mount 100. In other words, after substituting device mount 200 for device tray 150, controller mount 300 may be configured or used in any of the manners illustrated in FIGS. 1-15. FIG. 20 illustrates a side view of controller mount 300.

In some examples, any of the components described herein may be swapped or switch out for replacements of other sizes or configurations in order to accommodate a smartphone, computer, or game controller of another size or shape.

The elements, components, and steps described herein are meant to exemplify some types of possibilities. In no way should the aforementioned examples limit the scope of the invention, as they are only exemplary embodiments.

The phrases "in some embodiments," "according to some embodiments," "in the embodiments shown," "in other embodiments," "in some examples," "in other examples," "in some cases," "in some situations," "in one configuration," " "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The foregoing disclosure has been presented for purposes of illustration and description. Other modifications and variations of the disclosed techniques may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention, except as limited by the prior art.

What is claimed is:

1. A game controller adapter for use with a game controller and a display device, the game controller adapter comprising:

a controller receiver configured to be removably attached to the game controller, wherein controls of the game controller remain accessible and usable when the game controller is removably attached to the controller receiver;

an arm having a first end and a second end, wherein the first end of the arm is pivotably attached to the controller receiver with a first pivot mechanism at a first pivot axis, wherein the first pivot mechanism includes:

one or more conical hubs attached to one of the arm and the controller receiver; and one or more hub receivers attached to the other of the arm and the controller receiver, wherein each of the one or more hub receivers is configured to receive a respective one of the one or more conical hubs, and wherein the one or more conical hubs are configured to rotate relative to the one or more hub receivers about the first pivot axis;

a device tray pivotably attached to the second end of the arm at a second pivot axis, wherein the device tray is configured for receiving and holding the display device at an adjustable height and an adjustable viewing angle relative to the controller receiver, wherein the height and the viewing angle are adjustable through movement of the arm at the first pivot axis and movement of the device tray at the second pivot axis, and wherein the device tray includes two or more movable device arms configured for removably retaining the display device on the device tray; and a locking mechanism attached to the arm, the locking mechanism having a locked position and an unlocked position, wherein the locking mechanism is configured to prevent movement of the arm relative to the controller receiver at the first pivot axis when the locking mechanism is in the locked position, and wherein the locking mechanism is configured to permit movement of the arm relative to the controller receiver at the first pivot axis when the locking mechanism is in the unlocked position.

2. The game controller adapter of claim 1 wherein the arm and the device tray are removable from the controller receiver such that the arm and the device tray are jointly usable as an adjustable stand for the display device separate from the controller receiver when the arm and the device tray are placed on a substantially horizontal surface.

3. The game controller adapter of claim 1 wherein the display device is one of a smartphone and a tablet computer.

4. The game controller adapter of claim 1 wherein the controller receiver includes an adjustable feature configured for receiving the game controller and also configured for alternately receiving a second game controller having a different size than the game controller.

5. The game controller adapter of claim 1 wherein each of the one or more conical hubs includes a plurality of splines which mate with the one or more hub receivers, respectively, to hold the arm at one of a plurality of defined angles relative to the controller receiver.

6. The game controller adapter of claim 5 wherein the one or more conical hubs is two conical hubs and the one or more hub receivers is two hub receivers, wherein each of the two conical hubs is attached to a respective flexible arm extension extending from the arm.

7. The game controller adapter of claim 6 wherein the flexible arm extensions are configured to flex toward each other when external force is applied to disengage each conical hub from the respective hub receiver.

8. The game controller adapter of claim 7 wherein the locking mechanism prevents the flexible arm extensions from flexing toward each other when the locking mechanism is in the locked position thereby maintaining each conical hub engaged with the respective hub receiver when the locking mechanism is in the locked position.

9. A multi-function controller mount for use with a game controller and a smartphone, the multi-function controller mount comprising:

a controller receiver adapted to be removably attached to the game controller, wherein controls of the game controller remain accessible and usable when the controller receiver is removably attached to the game controller;

an arm having a first end and a second end, wherein the first end of the arm is pivotably attached to the controller receiver at a first pivot axis which includes one or more conical hubs attached to one of the arm and the controller receiver, wherein one or more hub receivers are attached to the other of the arm and the controller receiver, wherein each of the one or more hub receivers is adapted to receive a respective one of the one or more conical hubs, and wherein the one or more conical hubs are adapted to rotate relative to the one or more hub receivers about the first pivot axis;

a device mount pivotably attached to the second end of the arm at a second pivot axis, wherein the device mount is adapted for holding the smartphone at an adjustable position relative to the controller receiver, wherein the adjustable position is adjustable through movement of the arm at the first pivot axis and movement of the device mount at the second pivot axis; and a lock lever attached to the arm, the lock lever having a locked position and an unlocked position, wherein the lock lever is adapted to prevent movement of the arm relative to the controller receiver at the first pivot axis when the lock lever is in the locked position, and wherein the lock lever is adapted to permit movement of the arm relative to the controller receiver at the first pivot axis when the lock lever is in the unlocked position.

10. The multi-function controller mount of claim 9 wherein the device mount includes two or more movable device arms adapted for removably retaining the smartphone on a surface of the device mount.

11. The multi-function controller mount of claim 9 wherein the device mount includes a magnet adapted for removably magnetically retaining the smartphone on the device mount.

12. The multi-function controller mount of claim 9 wherein the device mount includes a magnet adapted for removably magnetically retaining a protective case for the smartphone on the device mount.

13. The multi-function controller mount of claim 9 wherein the second pivot axis comprises a friction hinge.

14. The multi-function controller mount of claim 9 wherein each of the one or more conical hubs includes a plurality of splines which mate with the one or more hub receivers, respectively, to hold the arm at a selected one of a plurality of defined angles relative to the controller receiver.

15. The multi-function controller mount of claim 14 wherein the one or more conical hubs is two conical hubs and the one or more hub receivers is two hub receivers, wherein each conical hub is attached to a flexible arm extension extending from the arm.

16. The multi-function controller mount of claim 15 wherein the flexible arm extensions are adapted to flex toward each other when external force is applied to the flexible arm extensions to disengage each conical hub from the respective hub receiver, and wherein the lock lever is adapted to prevent the flexible arm extensions from flexing toward each other when the lock lever is in the locked position thereby maintaining each conical hub engaged with the respective hub receiver when the lock lever is in the locked position.

17. The multi-function controller mount of claim 9 wherein the arm and the device mount are removable from the controller receiver such that the arm and the device mount are also usable as an adjustable stand for the smartphone separate from the controller receiver when the arm and the device mount are placed on a substantially horizontal surface.

\* \* \* \* \*